United States Patent [19]
Lee

[11] Patent Number: 5,746,325
[45] Date of Patent: May 5, 1998

[54] KNOCKDOWN CD/AUDIO TAPE STORAGE RACK

[76] Inventor: Yu-jong Lee, 10F-3, No. 9, Sec. 2, Roosevelt Rd., Taipei, Taiwan

[21] Appl. No.: 604,484

[22] Filed: Feb. 21, 1996

[51] Int. Cl.$^6$ ............................................. A47G 29/00
[52] U.S. Cl. .................. 211/40; 211/194; 403/293; 403/295; 403/381; 403/403
[58] Field of Search .................. 211/40, 88, 194; D6/407, 629, 630; 206/308.1, 387.14, 387.15; 403/293, 295, 381, 387, 403

[56] References Cited

U.S. PATENT DOCUMENTS

| | | | |
|---|---|---|---|
| 3,635,350 | 1/1972 | Wolf | 211/40 |
| 3,760,937 | 9/1973 | Van Wyngarden et al. | 206/387.15 |
| 3,783,543 | 1/1974 | Hemgren | 403/295 X |
| 4,497,125 | 2/1985 | Hutchinson | 211/88 X |
| 4,630,732 | 12/1986 | Snyman | 211/40 X |
| 4,640,415 | 2/1987 | Ackeret | 206/308.1 |
| 4,768,655 | 9/1988 | MacGregor | 211/194 X |
| 4,892,189 | 1/1990 | Kunimune et al. | 206/232 |
| 4,932,522 | 6/1990 | Milovich | 211/40 X |
| 5,054,629 | 10/1991 | Breen | 211/194 X |
| 5,078,270 | 1/1992 | Campbell | 211/194 X |
| 5,172,817 | 12/1992 | Gross | 211/40 |
| 5,191,983 | 3/1993 | Hardy | 211/40 |
| 5,192,042 | 3/1993 | Wotring et al. | 211/194 X |
| 5,251,749 | 10/1993 | Knight | 206/387.15 X |
| 5,267,659 | 12/1993 | Fickling et al. | 211/40 |
| 5,370,244 | 12/1994 | Peng | 211/40 |
| 5,405,043 | 4/1995 | Meloney | 211/88 X |
| 5,458,238 | 10/1995 | Dominguez-Gutierrez | 206/387.14 |
| 5,462,177 | 10/1995 | O'Donnell | 211/88 X |
| 5,518,112 | 5/1996 | Ono et al. | 211/40 X |
| 5,555,986 | 9/1996 | Lee | 211/40 |

Primary Examiner—Korie Chan
Assistant Examiner—Sandra Snapp
Attorney, Agent, or Firm—Bacon & Thomas

[57] ABSTRACT

Disclosed is a knockdown CD/audio tape storage rack mainly including at least two supporting plates and a plurality of connecting blocks. Each of the supporting plate has a push means provided thereon near a rear end thereof and two side rails of which each is formed with cuts for the connecting blocks to slidably mount on the rails. The connecting block has two side receiving channels to engage with the side rails of the supporting plates and a top engaging piece and a bottom receiving channel having complementary profiles to allow two superposed connecting blocks to engage with each other. Thereby, unlimited number of supporting plates can be connected by the connecting blocks to define multiple layers and/or multiple lines of continuous compartments forming the knockdown CD/audio tape storage rack. The number of lines and layers of the compartments can be freely increased or decreased as necessary. The push means allows a CD/audio tape to position in a compartment by pushing the CD/audio tape against the push means once and to be removed from the compartment by a second time push against the push means.

1 Claim, 3 Drawing Sheets

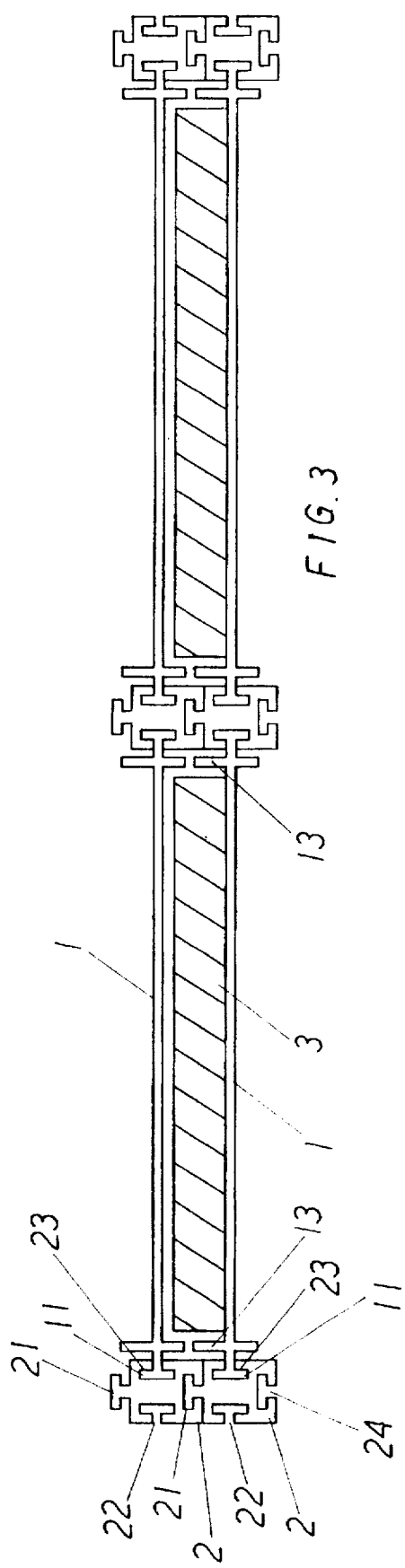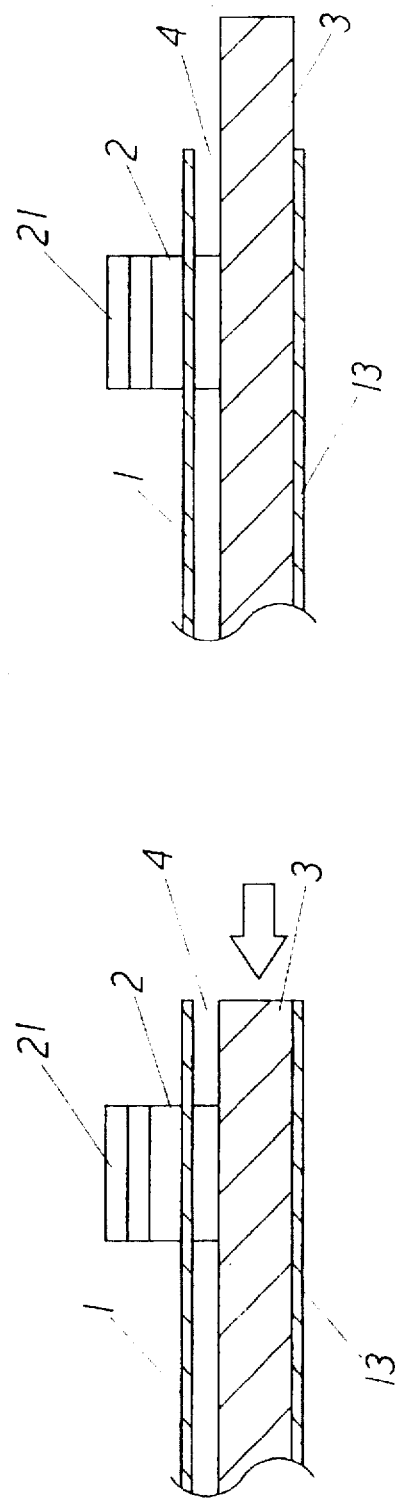

KNOCKDOWN CD/AUDIO TAPE STORAGE RACK

BACKGROUND OF THE INVENTION

1. Field of the Invention

The present invention relates to a knockdown CD/Audio tape storage rack mainly including at least two supporting plates and a plurality of connecting blocks. Each of the supporting plate has a push means provided thereon near a rear end thereof and two side rails of which each is formed with cuts for the connecting blocks to slidably mount thereon. The connecting blocks are so formed that multiple supporting plates can be connected by them to form a storage rack with multiple layers and/or multiple lines of continuous compartments for storing CD and/or audio tapes. The number of lines and layers of the compartments can be freely increased or decreased as necessary.

2. Description of the Prior Art

Most of the presently available CD/audio tape racks are a cuboid or a cube with fixed dimensions to provide limited spaces for storing CDs and/or audio tapes. Such conventional CD/audio tape racks have poor structure and are not practical and convenient in use because of the following:

a. The conventional CD/audio tape rack has fixed dimensions which might be too large for a user while there are not so many CDs or audio tapes to be stored, or too small to accommodate all the CDs or audio tapes the user has.

b. The conventional CD/audio tape rack does not provide any means for the respective stored CD/audio tape to automatically spring out of the compartment in which the Cd/audio is stored. The CD/audio tape stores in the conventional CD/audio tape rack can be removed from the rack only by fingers which is time and effort consuming.

c. The conventional CD/audio tape rack with fixed dimensions tends to tilt over when the size is too big and can not be changed to meet the space of room nor be easily relocated.

It is therefore desirable to develop a CD/audio tape rack with improved structure and functions to eliminate the disadvantages existed in the conventional CD/audio tape racks.

SUMMARY OF THE INVENTION

A primary object of the present invention is to provide a knockdown CD/audio tape storage rack which may be assembled to have different dimensions to meet the actual need of a user.

Another object of the present invention is to provide a knockdown CD/audio tape rack storage rack which has simple structure for easy assembling and disassembling. The rack can be easily operated and can stand stably. The manufacturing cost of the rack is also largely reduced, compared with the conventional CD/audio tape racks.

The knockdown CD/audio tape storage rack according to the present invention shall include at least two supporting plates and a plurality of connecting blocks. Each of the supporting plate has a push means provided thereon near a rear end thereof and two side rails of which each is formed with cuts for the connecting blocks to quickly slidably mount on the rail from the cuts. The connecting block each is formed at its top side with an engaging piece, and at it bottom, left, and right sides each with a receiving channel, such that the connecting block may be slidably mounted on the side rail of the supporting plate by engagement of its one side channel with the side rail of the supporting plate, and that two connecting blocks can be vertically connected together by engagement of the bottom channel of the upper block with the top connecting piece of the lower block. Two supporting plates parallelly connected together by the connecting blocks form a unit of room between them to store a CD or an audio tape cassette therein. Multiple rows and lines of such unit of room can be freely formed by using more connecting blocks to connect more supporting plates. The push means at the rear end of each supporting plate allows the stored CD/audio tape to easily and quickly spring out of the storage room between every two supporting plates by simply two pushes against the desired CD/audio tape.

BRIEF DESCRIPTION OF THE DRAWINGS

FIG. 3 is a front sectional view showing the manner in which the supporting plates and connecting blocks are assembled to provide the storage rooms;

FIG. 4 is a fragmentary side sectional view showing the manner in which a CD or audio tape is put into a storage room of the rack of the present invention; and FIG. 5 is a fragmentary side sectional view showing the position of a CD or audio tape in the storage room when it is automatically sprung outward by the push means of the present invention.

DETAILED DESCRIPTION OF THE PREFERRED EMBODIMENT

Figure 1:
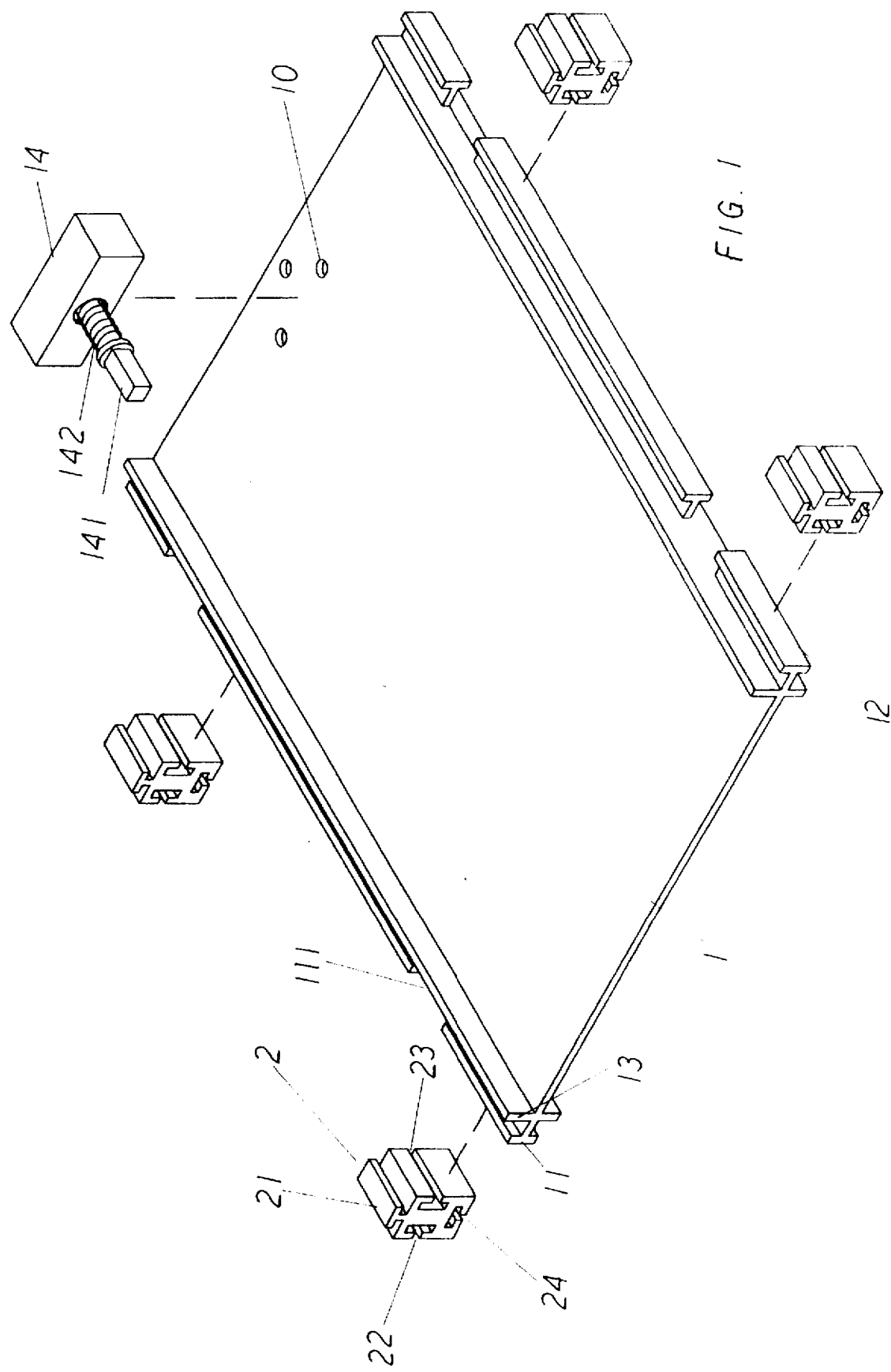
FIG. 1 is a disassembled perspective showing the supporting plate, push means, and connecting blocks forming a basic unit of the CD/audio tape storage rack of the present invention.
Figure 2:
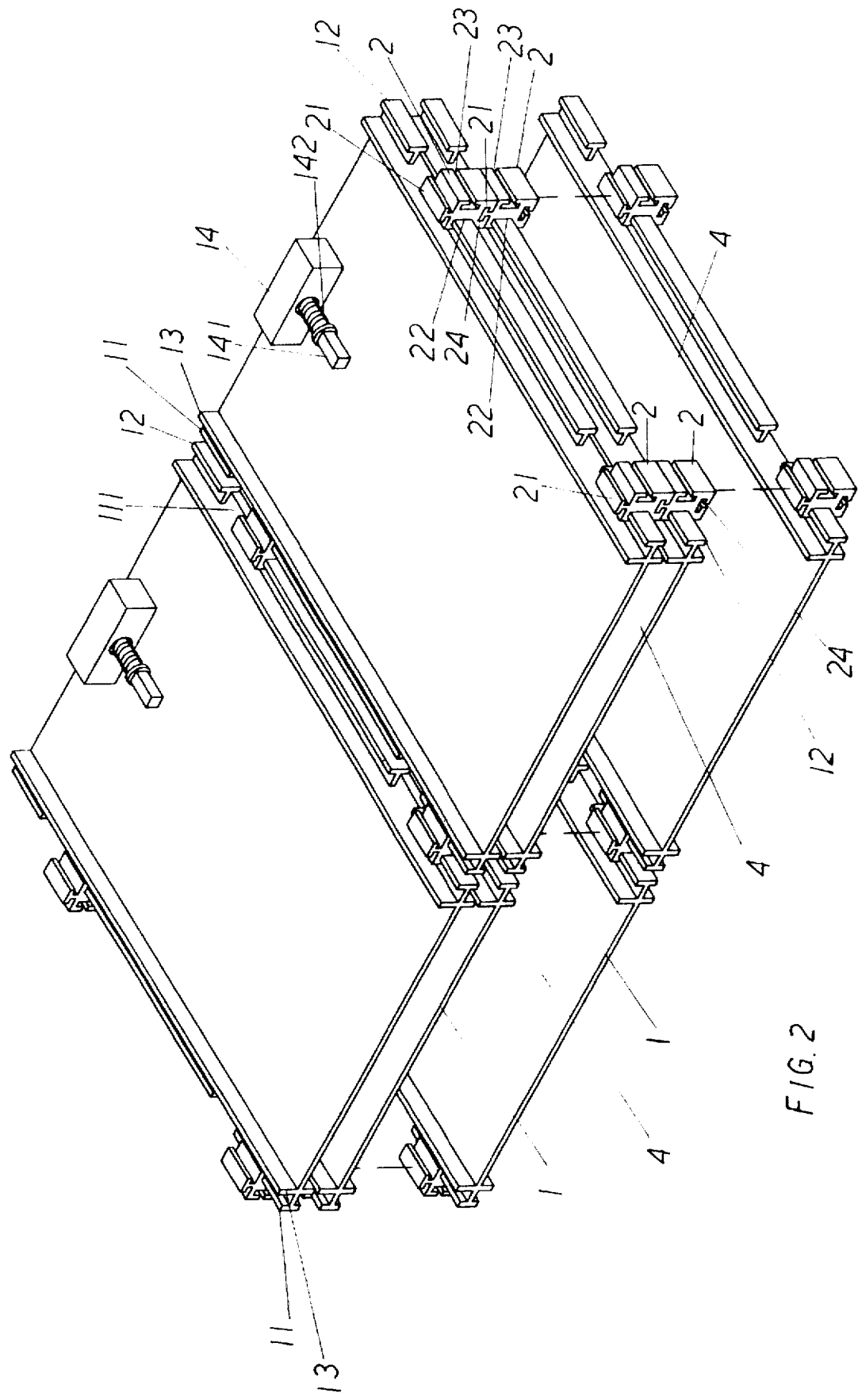
FIG. 2 is a perspective showing a part of the rack of the present invention in an assembled form and the manner in which the supporting plates and connecting blocks are assembled.

Please refer to FIGS. 1 and 2. The present invention is a knockdown CD/audio tape storage rack providing a plurality of storage rooms or compartments 4 formed from a plurality of supporting plates 1 connected by a plurality of connecting blocks 2. For one storage room or compartment 4, it includes two supporting plates 1 and at least six connecting blocks 2. The support plate 1 each has through holes 10 formed at a rear end thereof so that screws may thread therethrough to fix a two-step push means 14 thereto. The push means 14 includes a push rod 141 projected from a front face thereof for pushing against a CD/audio tape 3 (not shown) located on the supporting plate 1, and a return spring 142 put around the push rod 141. The supporting plate 1 has two side rails 11, 12 each at one side of the plate 1. Two cuts 111 are separately provided on each side rail 11, 12 near a front and a rear end thereof. An inner stop piece 13 is formed on each side rail 11, 12 at an inner side adjacent to an edge of the supporting plate 1.

The connecting block 2 each has an engaging piece 21 projected from a top side thereof and three receiving channels 22, 23, and 24 respectively formed at a left, a right, and a bottom side of the block 2. The bottom receiving channel 24 has an inner profile the same as an outer configuration of the top engaging piece 21, so that a connecting block 2 may be superposed on and connected to another connecting block 2 by engagement of the bottom receiving channel 24 of the upper block 2 with the top engaging piece 21 of the lower block 2. Moreover, the left and the right receiving channels 22, 23 both have an inner profile the same as an outer configuration of the side rails 11, 12, so that a connecting block 2 may be slidably mounted onto a side rail 11 or 12 from any of the cuts 111 on the side rail 11, 12. With the inner stop piece 13, the connecting block 2 can be more easily mounted onto the side rails 11, 12 and slide more stably along the same.

The CD/audio tape storage rack of the present invention can be very easily assembled from the supporting plates 1 and the connecting blocks 2. To do so, necessary pieces of connecting blocks 2 are first separately mounted onto the side rails 11, 12 of two supporting plates 1. Second, engage the bottom receiving channel 24 of the connecting blocks 2 mounted onto the upper supporting plate 1 with the engaging piece 21 of the connecting blocks 2 mounted onto the lower supporting plate 1. Then, align the upper and the lower supporting plates 1 with each other, thereby a room 4 is formed between the two supporting plates 1 for accommodating a CD or an audio tape 3 therein. To form more such storage rooms 4 to either side of the first storage room 4, use the connecting blocks 2 already mounted on either side rails 11, 12 of the first two supporting plates 1 to connect another two supporting plates 1 and mount another two connecting blocks 2 onto the left or the right side rail 11 or 12 of each of the newly connected supporting plates via the cuts 111 thereof. And then, align the new supporting plates 1 with the first two supporting plates 1 to form another storage room 4 to one side of the original one, as shown in FIGS. 2 and 3.

To form more such storage rooms 4 to a top side of the first storage room 4, prepare another supporting plate 1 with necessary connecting blocks 2 mounted onto the side rails 11, 12 thereof, connect the newly prepared supporting plate 1 to a top side of the first assembled ones by engaging the top engaging pieces 21 of the connecting blocks 2 already mounted on either side rails 11, 12 of the existed lower supporting plate 1 with the bottom receiving channels 24 at two sides of the newly prepared supporting plate 1, and then, align the new supporting plate 1 with the original supporting plates 1 below it to form another storage room 4 above the original one, as shown in FIG. 2. Similar steps can be repeated to form more storage rooms 4 above the lower storage rooms 4. Or, to form more such storage rooms 4 to a bottom side of existed storage rooms 4, prepare another supporting plate 1 with necessary connecting blocks 2 mounted onto the side rails 11, 12 thereof, connect the newly prepared supporting plate 1 to a bottom side of the first assembled ones by engaging the bottom receiving channels 24 of the connecting blocks 2 already mounted on either side rails 11, 12 of the already existed upper supporting plate 1 with the top engaging pieces 21 at two sides of the newly prepared supporting plate 1, and then, align the new supporting plate 1 with the original supporting plates 1 atop it to form another storage room 4 below the original one. Similar steps can be repeated to form more storage rooms 4 below the upper storage rooms 4.

More particularly, the storage room 4 each is defined by the inner stop pieces 13 of the two side rails 11, 12 and the two-step push means 14 at the rear end of the supporting plate 1 and has a front opening. Please refer to FIGS. 4 and 5 which respectively show the position and the removal of a CD or an audio tape 3 into and from a storage room 4. To store a CD or an audio tape 3 in the stroage room 4, simply insert the CD or tape 3 into the room 4 from the front opening of the room 4 between two superposed supporting plates 1 until the CD or tape 3 touches the push rod 141 of the push means 14 (not shown). Further push the CD or tape 3 so that the push rod 141 is pressed backward into the push means 14 and is retained therein. At this time, the CD or tape 3 is positioned in the room 4 with its front edge flush with the front opening of the room 4, as shown in FIG. 4. To remove the CD or tape 3 from the room 4, simply push the CD or tape 3 again and the push rod 141 will, under the spring force of the return spring 142, move forward from the push means 14 to push the CD or tape 3 so that the latter projects out of the front opening of the room 4, as shown in FIG. 5. The operation is simple and effortless.

What is claimed is:

1. A knockdown CD/audio tape storage rack comprising a plurality of rows and lines of continuous compartments each for storing a CD or an audio tape therein, said compartments each being assembled from two superposed supporting plates and at least six connecting blocks slidably mounted onto two lateral sides of said supporting plates to connect said supporting plates together;

said supporting plates each having two side rails one at each lateral side thereof and a two-step push means connected to a rear end thereof, said side rails each having a front cut and a rear cut for said connecting blocks to be easily mounted onto said side rails, and a stop piece disposed at an inner side adjacent to an edge of said supporting plates of said rail, said two-step push means having a retractable front push rod and a return spring put around said push rod, such that said CD/Audio tape can be positioned in said compartment with a front side thereof flush with a front opening of said compartment by inserting said CD/audio tape into said compartment and pushing said push rod back into said push means, and that said inserted CD/audio tape can be easily removed from said compartment simply by pushing said CD/audio tape once again to touch and release said retracted push rod from said push means under a spring force of said return spring; and said connecting block each being formed with a top engaging piece, and a left, a right, and a bottom receiving channels, said top engaging piece having an outer configuration the same as an inner profile of said bottom channel such that each said connecting block is allowed to have another connecting block connected to an upper and/or a lower side thereof, and said left and said right receiving channels both having an inner profile the same as an outer configuration of said side rails of said supporting plates, such that each said connecting block is allowed to fitly mount on said side rail and be stably moved along said rail and is allowed to have a second supporting plate connected to one of said left and right side receiving channel thereof; and thereby unlimited number of said supporting plates can be connected by said connecting blocks to define multiple rows and lines of continuous compartments for accommodating CDs and/or audio tapes, forming said knockdown CD/audio tape storage rack.

* * * * *